United States Patent
Pukkila et al.

(10) Patent No.: US 7,200,172 B2
(45) Date of Patent: Apr. 3, 2007

(54) METHOD AND APPARATUS FOR DETERMINING COMPONENTS OF A CHANNEL IMPULSE RESPONSE FOR USE IN A SAIC EQUALIZER

(75) Inventors: Markku Pukkila, Espoo (FI); Gian-Paolo Mattellini, Helsinki (FI); Pekka A. Ranta, Nummela (FI)

(73) Assignee: Nokia Corporation, Espoo (FI)

( * ) Notice: Subject to any disclaimer, the term of this patent is extended or adjusted under 35 U.S.C. 154(b) by 755 days.

(21) Appl. No.: 10/439,068

(22) Filed: May 15, 2003

(65) Prior Publication Data

US 2004/0170234 A1    Sep. 2, 2004

Related U.S. Application Data

(63) Continuation-in-part of application No. 10/375,591, filed on Feb. 27, 2003, now Pat. No. 7,006,811.

(51) Int. Cl.
*H03H 7/30* (2006.01)
(52) U.S. Cl. .................................... 375/231
(58) Field of Classification Search ........... 375/231, 375/232
See application file for complete search history.

(56) References Cited

U.S. PATENT DOCUMENTS

| | | | | |
|---|---|---|---|---|
| 6,269,131 | B1 * | 7/2001 | Gothe et al. | 375/346 |
| 6,408,022 | B1 * | 6/2002 | Fertner | 375/230 |
| 6,539,067 | B1 * | 3/2003 | Luschi et al. | 375/340 |

OTHER PUBLICATIONS

Wireless Personal Communications, No. 19, pp. 37-55; 2001 Klower Academic Press.

* cited by examiner

*Primary Examiner*—Kevin Kim
(74) *Attorney, Agent, or Firm*—Ware, Fressola, Van Der Sluys & Adolphson LLP

(57) ABSTRACT

A method of operation of a receiver of a mobile station or a base station of a radio access network and corresponding equipment, the method for especial use in providing interference cancellation according to a single antenna interference cancellation (SAIC) algorithm. The method includes a step (22) in which a channel estimator (12) estimates channel impulse response components for use by a SAIC equalizer (14); in estimating the channel impulse response components, the channel estimator (12) minimizes a special cost function ($J_{ch}(h)$) with respect to the components of the channel impulse response h. In some embodiments, the method uses an iterative least mean squares procedure to minimize the cost function ($J_{ch}(h)$).

19 Claims, 2 Drawing Sheets

METHOD AND APPARATUS FOR DETERMINING COMPONENTS OF A CHANNEL IMPULSE RESPONSE FOR USE IN A SAIC EQUALIZER

CROSS REFERENCE TO RELATED APPLICATION

This application is a continuation-in-part of application Ser. No. 10/375,591, filed Feb. 27, 2003 now U.S. Pat. No. 7,006,811.

TECHNICAL FIELD

The present invention pertains to the field of cellular telephony receivers. More particularly, the present invention pertains to canceling interference in a cellular network receiver, and especially a receiver of a mobile telephone or a base station receiver.

BACKGROUND ART

Mobile terminals using cellular networks often experience interference from various sources or due to various causes, such as interference caused by the same signal arriving at the mobile terminal at slightly different times after having propagated along different paths, i.e. so-called multipath interference. As is known, it is often possible to cancel interfering signals at a receiver, and the prior art teaches various methods of interference cancellation (IC), both at mobile terminals and at base stations. Mobile terminals often implement so-called single antenna interference cancellation (SAIC) algorithms, since physical constraints make it difficult to use more than one antenna in providing IC. A SAIC algorithm estimates and removes the effect of interference from a received signal.

In using a SAIC algorithm in a receiver of a mobile telephone, it is often (when using a non-blind method) necessary to estimate parameters that characterize the communication channel over which the mobile is communicating. Estimates of the channel parameters (i.e. the so-called channel impulse response components) made according to the prior art are significantly degraded in the presence of interference, and so receiver performance suffers. Clearly, to the extent that interference can be suppressed, performance is improved. In other words, if the parameters that characterize the communication channel (i.e. the channel impulse response components) can be selected so as to suppress one or another component of interference, receiver performance will be improved.

Interference sometimes includes as a component (besides noise) an interfering signal (from a radio, i.e. as opposed to noise). To handle such interference, radio receivers may include what is called a CM-SAIC (constant modulus-single antenna interference cancellation) equalizer, which is provided with the above-mentioned communication channel parameters by a channel estimator also included in the receiver. The prior art does teach algorithms for a channel estimator suitable for a CM-SAIC equalizer, but the estimates are somewhat inaccurate, and so what is needed is an improved procedure (algorithm) for estimating the communication channel parameters (channel impulse response components) so as to be suitable for use in a CM-SAIC equalizer.

DISCLOSURE OF THE INVENTION

Accordingly, in a first aspect of the invention, a method is provided for use by a receiver of a wireless communication system in receiving over a communication channel a radio transmission burst of a number of symbols including a known training sequence of symbols, the communication channel having a channel response to a transmitted symbol, the receiver using an equalizer having taps based on estimated values of components of a channel impulse response characterizing the response of the communication channel to a transmitted symbol, the method including a step of receiving and sampling the radio transmission burst, the method characterized by: a step of minimizing, with respect to possible values of the channel impulse response components, a cost function indicating a cumulative difference magnitude between power associated with estimated interference samples and an average interference power, wherein the interference samples are estimated as a difference between samples of the received radio transmission burst and the corresponding channel response to the known training sequence.

In accord with the first aspect of the invention, the cost function may be:

$$J_{ch}(h) = \sum_{k=1}^{P} \left| \left| y_k - \sum_{l=0}^{L} m_{k-n} h_n \right|^r - \bar{e}^r \right|^s,$$

in which, $$\bar{e}^r \equiv \frac{1}{P} \sum_{k=1}^{P} \left| y_k - \sum_{n=0}^{L} m_{k-n} h_n \right|^r,$$

where r and s are positive integers, and where $y_k$ is a sample of the received radio transmission burst corresponding to a transmitted symbol but distorted by the communication channel, where $m_{k-n}$ is a symbol included in the training sequence symbols, where $h_n$ is a component of the channel impulse response, where P is the number of symbols in the transmitted training sequence, and where L+1 is the number of taps in a transversal filter used to model the communication channel. Further, in determining estimates for the components of the channel impulse response that minimize the cost function, various methods or techniques may be used, including for example a least squares method, an iterative-least squares method, a recursive least squares method, or a Kalman filtering technique. In case of using iterative least squares, after an initial value for channel impulse response is made, each next step in the iteration may provide a next best estimate of the channel impulse response according to:

$$\hat{h}^{(k+1)} = \hat{h}^{(k)} - \mu \frac{d}{dh} J_{ch}(\hat{h}^{(k)}),$$

where $$\frac{d}{dh}$$

denotes the gradient vector with respect to the channel impulse response h, and μ is a step size. In such a procedure, the initial value for channel impulse response may be made using:

$$\hat{h}^{(0)} = (M^H M)^{-1} M^H y,$$

where M is a matrix constructed from the P training sequence symbols, and the y are corresponding received samples.

In a second aspect of the invention, a receiver used as part of or with a wireless communication system is provided, characterized in that it comprises means for performing the step, according to the first aspect of the invention, of minimizing the cost function. Further, the receiver may be part of a mobile station or part of a base station of a radio access network of the wireless communication system.

In a third aspect of thee invention, a system is provided, comprising a mobile station and a base station used as part of or with a wireless communication system, each including a receiver, characterized in that at least one of the receivers comprises means for performing the step, according to the first aspect of the invention, of minimizing the cost function.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
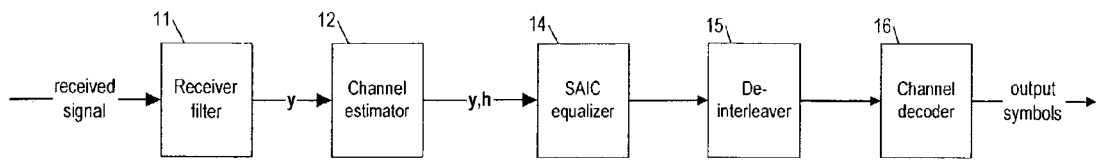
FIG. 1 is a block diagram/flow diagram of components of a receiver according to the invention.

Referring now to FIG. 1, a cellular network receiver in which the invention can be used is shown as including a receiver filter 11 (typically a finite impulse response matched filter), which provides a filtered and sampled (baseband) waveform with the (received) samples indicated here as components of a vector y. The receiver filter 11 is followed by a channel estimator 12, such as e.g. a constant modulus channel estimator, which assumes constant modulus (constant signal power) for any interfering signals. Using as an input the received samples y, the channel estimator provides the values of the components of the channel impulse response h with components $h_i$, and the components $h_i$ are then used by later stages in the receiver in a nonlinear symbol or sequence detector or in calculating tap values for a transversal filter used by the receiver in determining transmitted symbols from received symbols. The channel estimator, in the embodiment shown, provides the channel impulse response components $h_i$ to an SAIC equalizer 14. In other embodiments, other kinds of equalizers may be used with a channel estimator according to the invention, or combinations of different kinds of equalizers may be used, with a criteria for selecting one or another of the equalizers depending on measurements indicating which of the equalizers would be most suitable under current operating conditions. For example, a receiver might include both a SAIC equalizer and a conventional (non-SAIC) equalizer, and the channel estimator might provide to a selector module the channel impulse response components $h_i$ along with a measurement indicating whether or not a strong interfering signal is present, and the selector module would then select to use either the SAIC equalizer or the conventional equalizer, depending on the measurement provided by the channel estimator module (with the decision usually made by comparing the measurement value with a predetermined threshold). An example of a conventional (non-SAIC) equalizer is an equalizer that minimizes either the sequence error probability, in what is called Maximum-Likelihood Sequence Estimation (MLSE), or the symbol error probability, in what is called Maximum A Posteriori (MAP) equalizer.

The SAIC equalizer 14 can be implemented to use either a blind SAIC algorithm or a joint detection SAIC algorithm. The blind SAIC algorithm can be based e.g., on an assumed constant modulus (CM) property (i.e. constant signal power or, equivalently, constant envelope) of the interfering signal, and minimizes a cost function $J_d(a)$ (with subscript d referring to 'detector', since another cost function is also used, but associated with a channel estimator) calculated using:

$$J_d(a) = \sum_{k=1}^{K} \left[ \left| y_k - \sum_{l=0}^{L} a_{k-l} h_l \right|^2 - \bar{e}^2 \right]^2, \quad (1)$$

where K is the number of symbols in the burst, where L+1 is the number of estimated channel impulse response taps, where the $y_k$ are the received samples (symbols), where the $a_k$ are the transmitted symbols (which the detector tries to determine from the received samples $y_k$) and the minimization of the cost function is done with respect to the vector a (having as its components K transmitted symbols $a_k$)/and where the $h_k$ are the channel impulse response components (so that the output of the transversal filter representing the channel having as inputs the transmitted samples $a_k$ are the noisy received samples $$y_k = \sum_{l=0}^{L} a_{k-l} h_l + n_k,$$

where $n_k$ are thermal noise samples), and where $\bar{e}^2$ denotes the mean squared interference envelope or average interference power (of an interfering signal), which can be estimated with the aid of a known training sequence of P symbols $m_k$ (included in the middle of each transmission burst) as follows:

$$\bar{e}^2 \equiv \frac{1}{P} \sum_{k=1}^{P} \left| y_k - \sum_{l=0}^{L} m_{k-l} h_l \right|^2. \quad (2)$$

According to the invention, the channel estimator 12 estimates the channel impulse response h (i.e. it estimates the components $h_l$) by minimizing a channel estimator cost $J_{ch}(h)$ with respect to the channel impulse response h (i.e. with respect to the channel impulse response components $h_l$), where $J_{ch}(h)$ is given by:

$$J_{ch}(h) = \sum_{k=1}^{P} \left[ \left| y_k - \sum_{l=0}^{L} m_{k-l} h_l \right|^2 - \bar{e}^2 \right]^2, \quad (3)$$

in which the $m_k$ (for k=1 ... P) are the known training sequence of symbols included in a burst of K symbols. The channel impulse response that minimizes $J_{ch}(h)$ is here indicated as $\hat{h}$, i.e.:

$$\hat{h} = \arg\min_{h} J_{ch}(h),$$

in which the symbology argmin f(x) indicates the argument x that minimizes the function f(x). In minimizing the cost function given by eq. (3), what is minimized is the variance from the mean interference power (given by $\bar{e}^2$) of the square of what are here called interference samples, each interference sample being given by $$y_k - \sum_{l=0}^{L} m_{k-l} h_l.$$

In the ideal case the squared interference samples are, at all time instants, equal to the mean value of the squared interference samples (i.e. the mean interference power $\bar{e}^2$), in which case $J_{ch}(h)=0$.

Preferably, the cost function $J_{ch}(h)$ given by eq. (3) is minimized using an iterative least mean squares (LMS) procedure. In such a procedure, the values of the channel impulse response components are adjusted in the direction of steepest descent of the gradient (i.e. with respect to the components) of the cost function. The initial value for the channel impulse response that minimize the cost function can be given by a least-squares (LS) estimate, such as:

$$\hat{h}^{(0)} = (M^H M)^{-1} M^H y, \qquad (4)$$

where the matrix M is constructed from the P training symbols, and the y are, as above, the received samples. The LMS iteration is given by:

$$\hat{h}^{(k+1)} = \hat{h}^{(k)} - \mu \frac{d}{dh} J_{ch}(\hat{h}^{(k)}), \qquad (5)$$

where $$\frac{d}{dh}$$

denotes the gradient vector with respect to the channel impulse response h, and $\mu$ is a step size, which can be set as constant or changed adaptively from burst to burst.

It should be understood that the invention encompasses finding values for the channel impulse response components $h_k$ that (at least approximately) minimize the cost function $J_{ch}(h)$ given by eq. (3) using other methods as well. In other words, the iterative least mean squares procedure described above is only one way of practicing the invention. Other ways to practice the invention include using recursive least squares (RLS) algorithm or using a Kalman filter-based method. (Data processing in RLS and Kalman filtering is sequential, whereas in LMS it is batch processing, i.e. an average over the entire training sequence is calculated.)

Figure 2:
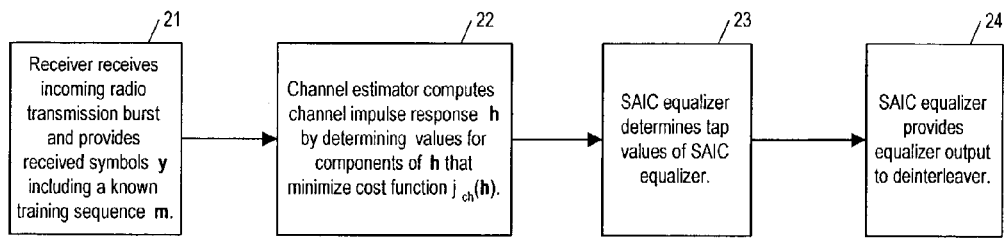
FIG. 2 is a flowchart showing a method of operation of a receiver according to the invention.

Referring now to FIG. 2, a method for operating a receiver as illustrated in FIG. 1 is shown as having a first step 21 in which the receiver 11 receives an incoming radio transmission burst and provides K received symbols (samples) $y_1, \ldots, y_K$ including a known training sequence of P symbols $m_1, \ldots, m_P$. In a next step 22, the channel estimator 12 uses the training sequence to compute the channel impulse response h by determining values for components of h that minimize cost function $J_{ch}(h)$ given by eq. (3). In eq. (3), difference between samples of the received radio transmission burst and the corresponding channel response to the known training sequence, i.e.

$$y_k - \sum_{l=0}^{L} m_{k-l} h_l$$

are here called interference samples. Since $\bar{e}^2$ is an average interference power (of an interfering signal), the cost function indicates a cumulative difference magnitude between power associated with the interference samples and the average interference power.

In a next step 23, the SAIC equalizer 14 determines tap values for a FIR (finite impulse response) filter in case of a linear SAIC equalizer 14, or performs a trellis search in case of a nonlinear equalizer structure. In a next step 24, the SAIC equalizer 14 provides the equalizer output (symbols according to e.g. the equalization FIR filter) to a deinterleaver 15 (FIG. 1), which then provides deinterleaved symbols to a channel decoder 16 (FIG. 1), which then provides the output symbols.

Figure 3:
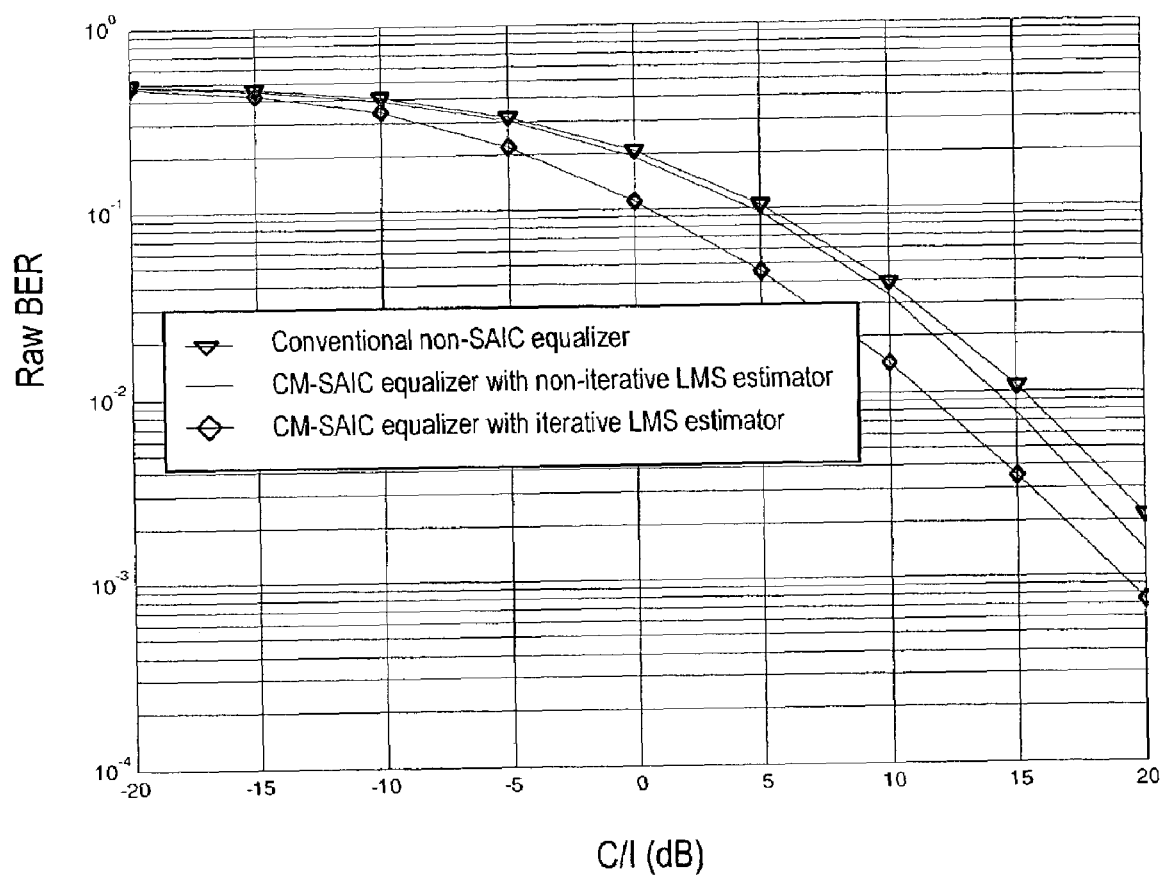
FIG. 3 is a graph showing performance of a CM-SAIC receiver according to a preferred embodiment of the invention—using iterative least mean squares to determine channel impulse response components—compared to CM-SAIC performance using non-iterative least mean squares channel estimation and also compared to using non-SAIC prior art techniques.

Referring now to FIG. 3, performance of a receiver of the type illustrated in FIG. 1 (using a CM-SAIC equalizer 14 and having a channel estimator 12) and according to the invention is indicated for a TU3 (Typical Urban Environment, 3 km/hr relative velocity) channel and a single co-channel interfering signal. A graph of raw bit error rate (BER) vs. Carrier-to-Interference Ratio (C/I) is shown for three cases: first, the CM-SAIC equalizer with a channel estimator using the iterative least mean squares procedure described above for determining the channel impulse response components that minimize the cost function given by eq. (3); second, the CM-SAIC equalizer with a channel estimator using a non-iterative least mean squares procedure for determining the channel impulse response components that minimize the cost function given by eq. (3), i.e. using simply the initial value for the channel impulse response given by eq. (4); and third, using a conventional (non-SAIC equalizer) procedure. The conventional curve is obtained by Max-Log-MAP (Maximum A Posteriori) detection. As shown, the CM-SAIC equalizer 14 provides no appreciable gain (compared to a conventional equalizer) if non-iterative least mean squares channel estimation is used in minimizing the cost function given by eq. (3) to arrive at estimates of the channel impulse response, but provides significant gain (4–5 dB) if iterative least mean squares procedure is used.

The invention encompasses not only the cost function given in eq. (3), but also any variants of the cost function given by eq. (3), variants that provide a cost proportional in some way to the cost given by eq. (3). In particular, the invention encompasses calculating cost using as the cost function $J_{ch}(h)$ the following:

$$J_{ch}(h) = \sum_{k=1}^{P} \left\| \left| y_k - \sum_{n=0}^{L} m_{k-n} h_n \right|^r - \bar{e}^r \right|^s \qquad (6)$$

where r and s are (possibly different) positive integers, and in which, $$\bar{e}^r \equiv \frac{1}{P} \sum_{k=1}^{P} \left| y_k - \sum_{n=0}^{L} m_{k-n} h_n \right|^r. \qquad (7)$$

For example, for both r=2 and s=2, the cost function given by eq. (6) (with $\bar{e}^2$ as defined by eq. (7)) is the same as the cost function given by eq. (3)(with $\bar{e}^2$ as defined by eq. (2)). However, for r=2 and s=1, the cost function provided by eq. (6) is:

$$J_{ch}(h) = \sum_{k=1}^{P} \left\| \left| y_k - \sum_{n=0}^{L} m_{k-n} h_n \right|^2 - \bar{e}^2 \right|,$$

with $\bar{e}^2$ as defined by eq. (2), and for r=1 and s=2 the cost function is:

$$J_{ch}(h) = \sum_{k=1}^{P} \left\| \left| y_k - \sum_{n=0}^{L} m_{k-n} h_n \right| - \bar{e} \right|^2$$

in which, $$\bar{e} \equiv \frac{1}{P} \sum_{k=1}^{P} \left| y_k - \sum_{n=0}^{L} m_{k-n} h_n \right|,$$

and so on for other values of r and s.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a receiver in wirelessly receiving over a communication channel a radio transmission burst of a number of symbols including a known training sequence of symbols, the communication channel having a channel response to a transmitted symbol, the receiver using an equalizer having taps based on estimated values of components of a channel impulse response characterizing the response of the communication channel to a transmitted symbol, the method comprising:

receiving and sampling the radio transmission burst; and minimizing, with respect to possible values of the channel impulse response components, a cost function indicating a cumulative difference magnitude between power associated with estimated interference samples and an average interference power, wherein the interference samples are estimated as a difference between samples of the received radio transmission burst and the corresponding channel response to the known training sequence.

2. A method as in claim 1, wherein the cost function is given by:

$$J_{ch}(h) = \sum_{k=1}^{P} \left\| \left| y_k - \sum_{n=0}^{L} m_{k-n} h_n \right|^r - \bar{e}^r \right|^s,$$

in which, $$\bar{e}^r \equiv \frac{1}{P} \sum_{k=1}^{P} \left| y_k - \sum_{n=0}^{L} m_{k-n} h_n \right|^r,$$

where r and s are positive integers, and where $y_k$ is a sample of the received radio transmission burst corresponding to a transmitted symbol but distorted by the communication channel, where $m_{k-n}$ is a symbol included in the training sequence symbols, where $h_n$ is a component of the channel impulse response, where P is the number of symbols in the transmitted training sequence, and where L+1 is the number of taps in a transversal filter used to model the communication channel.

3. A method as in claim 2, wherein in determining estimates for the components of the channel impulse response that minimize the cost function, a least squares method is used.

4. A method as in claim 3, wherein iteration is used in the least squares method, and after an initial value for channel impulse response is made, each next step in the iteration provides a next best estimate of the channel impulse response according to:

$$\hat{h}^{(k+1)} = \hat{h}^{(k)} - \mu \frac{d}{dh} J_{ch}(\hat{h}^{(k)}),$$

where $$\frac{d}{dh}$$

denotes the gradient vector with respect to the channel impulse response h, and μ is a step size.

5. A method as in claim 4, wherein the initial value for channel impulse response is made using:

$$\hat{h}^{(0)} = (M^H M)^{-1} M^H y,$$

where M is a matrix constructed from the P training sequence symbols, and the y are corresponding received samples.

6. A method as in claim 2, wherein in determining estimates for the components of the channel impulse response that minimize the cost function, a recursive least squares method is used.

7. A method as in claim 2, wherein in determining estimates for the components of the channel impulse response that minimize the cost function, a Kalman filter is used.

8. A receiver for wirelessly receiving over a communication channel a radio transmission burst of a number of symbols including a known training sequence of symbols, the communication channel having a channel response to a transmitted symbol, the receiver using an equalizer having taps based on estimated values of components of a channel impulse response characterizing the response of the communication channel to a transmitted symbol, the receiver comprising:
means for receiving and sampling the radio transmission burst; and
means for minimizing, with respect to possible values of the channel impulse response components, a cost function indicating a cumulative difference magnitude between power associated with estimated interference samples and an average interference power, wherein the interference samples are estimated as a difference between samples of the received radio transmission burst and the corresponding channel response to the known training sequence.

9. A receiver as in claim 8, wherein the receiver is part of a mobile station.

10. A receiver as in claim 8, wherein the receiver is part of a base station of a radio access network of the wireless communication system.

11. A system, comprising a mobile station and a base station used as part of or with a wireless communication system, wherein both the mobile station and the base station include a receiver, wherein at least one of the receivers is as in claim 8.

12. A receiver as in claim 8, wherein the cost function is given by:

$$J_{ch}(h) = \sum_{k=1}^{P} \left\| \left| y_k - \sum_{n=0}^{L} m_{k-n} h_n \right|^r - \bar{e}^r \right|^s,$$

in which, $$\bar{e}^r \equiv \frac{1}{P} \sum_{k=1}^{P} \left| y_k - \sum_{n=0}^{L} m_{k-n} h_n \right|^r,$$

where r and s are positive integers, and where $y_k$ is a sample of the received radio transmission burst corresponding to a transmitted symbol but distorted by the communication channel, where $m_{k-n}$ is a symbol included in the training sequence symbols, where $h_n$ is a component of the channel impulse response, where P is the number of symbols in the transmitted training sequence, and where L+1 is the number of taps in a transversal filter used to model the communication channel.

13. A receiver for wirelessly receiving over a communication channel a radio transmission burst of a number of symbols including a known training sequence of symbols, the communication channel having a channel response to a transmitted symbol, the receiver using an equalizer having taps based on estimated values of components of a channel impulse response characterizing the response of the communication channel to a transmitted symbol, the receiver comprising:
a receiver filter, for receiving and sampling the radio transmission burst; and
a channel estimator, for minimizing, with respect to possible values of the channel impulse response components, a cost function indicating a cumulative difference magnitude between power associated with estimated interference samples and an average interference power, wherein the interference samples are estimated as a difference between samples of the received radio transmission burst and the corresponding channel response to the known training sequence.

14. A receiver as in claim 13, wherein the cost function is given by:

$$J_{ch}(h) = \sum_{k=1}^{P} \left\| \left| y_k - \sum_{n=0}^{L} m_{k-n} h_n \right|^r - \bar{e}^r \right|^s,$$

in which, $$\bar{e}^r \equiv \frac{1}{P} \sum_{k=1}^{P} \left| y_k - \sum_{n=0}^{L} m_{k-n} h_n \right|^r,$$

where r and s are positive integers, and where $y_k$ is a sample of the received radio transmission burst corresponding to a transmitted symbol but distorted by the communication channel, where $m_{k-n}$ is a symbol included in the training sequence symbols, where $h_n$ is a component of the channel impulse response, where P is the number of symbols in the transmitted training sequence, and where L+1 is the number of taps in a transversal filter used to model the communication channel.

15. A receiver as in claim 14, wherein in determining estimates for the components of the channel impulse response that minimize the cost function, a least squares method is used.

16. A receiver as in claim 15, wherein iteration is used in the least squares method, and the channel estimator is configured so that after an initial value for channel impulse response is made, each next step in the iteration provides a next best estimate of the channel impulse response according to:

$$\hat{h}^{(k+1)} = \hat{h}^{(k)} - \mu \frac{d}{dh} J_{ch}(\hat{h}^{(k)}),$$

where $$\frac{d}{dh}$$

denotes the gradient vector with respect to the channel impulse response h, and μ is a step size.

17. A receiver as in claim 16, wherein the channel estimator is configured so that the initial value for channel impulse response is made using:

$$\tilde{h}^{(0)} = (M^H M)^{-1} M^H y,$$

where M is a matrix constructed from the P training sequence symbols, and the y are corresponding received samples.

18. A receiver as in claim 14, wherein in determining estimates for the components of the channel impulse response that minimize the cost function, a recursive least squares method is used.

19. A receiver as in claim 14, wherein in determining estimates for the components of the channel impulse response that minimize the cost function, a Kalman filter is used.

* * * * *